Patented July 7, 1942

2,289,278

UNITED STATES PATENT OFFICE 2,289,278

RESINOUS SULPHONATED CONDENSATION PRODUCTS

Arthur Voss and Willi Selle, Frankfort-on-the-Main, Germany, assignors, by mesne assignments, to General Aniline & Film Corporation, New York, N. Y., a corporation of Delaware No Drawing. Application September 12, 1939, Serial No. 294,486. In Germany September 13, 1938

2 Claims. (Cl. 260—49)

The present invention relates to condensation products.

Synthetic tanning agents have already been prepared by condensing and previously, simultaneously or subsequently sulphonating aromatic compounds. As starting materials there have, as a rule, been used aromatic bodies containing hydroxyl groups, i. e. phenol-like bodies, sometimes also aromatic bodies containing carboxylic or amido groups, or aromatic polynuclear hydrocarbons, particularly naphthalene. These starting materials are condensed before, during or after the sulphonation to form substances of high molecular weight. In most cases formaldehyde is used as a condensing agent, and in order to still more increase the value of the tanning agents a further component may react in the said condensation. As such further components there may be used: mono- or polynuclear phenols such as phenol as such, dihydroxydiphenylmethane, dihydroxydiphenylsulphone, dihydroxydiphenyldimethylmethane, furthermore hydroxybenzyl alcohol. Benzyl chloride or the derivatives thereof may also be used for the condensation for the purpose of increasing the molecule. The said main components of these tanning agents, such as phenol, naphthalene as such or in a condensed form are, however, more or less non-resistant to light, thus rendering the leathers treated with them likewise non-resistant to light.

Now, we have found that light-resistant leathers are obtained by using for tanning purposes resinous sulphonated condensation products containing methylene bridges and obtained by using as starting materials aromatic hydroxy compounds and aromatic mononuclear hydrocarbons containing at least one and at most four alkyl radicals. Mononuclear hydrocarbons suitable for the preparation of the new products are, for instance, toluene, ortho-, meta- and paraxylene as well as mixtures thereof, mesitylene, pseudocumene, hemellitol, the tetramethylbenzenes; ethylbenzene, the ethyltoluenes, propylbenzene, cumene. In practice, benzene itself is not used as starting material since, in the form of its free sulphonic acid, it can be further condensed only with difficulty. The hydrocarbons which are employed must contain at least one alkyl group. Moreover, there can only be used mononuclear aromatic hydrocarbons containing additionally in the nucleus at least two hydrogen atoms capable of being substituted, since at least one hydrogen atom must be free for the sulphonation and one hydrogen atom must be free for the condensation. For the purpose of transforming them into tanning agents, these hydrocarbons are condensed in known manner while forming a bridge with an aromatic hydroxy compound. Previously, simultaneously or subsequently sulphonation occurs, the condensation to a higher molecule taking place in the above named known manner.

As aromatic hydroxy compounds there may, for instance, be used: phenol, the three cresols as well as the mixtures thereof, the xylenols; furthermore the above-named aromatic hydroxy compounds applied in known processes. For the formation of the bridge there may particularly be used formaldehyde and acetaldehyde as well as substances yielding formaldehyde and substances yielding acetaldehyde such as polymeric formaldehyde and polymeric acetaldehyde.

The condensation may be performed in the manner already described, it being unnecessary to use further light-resistant components, since surprisingly components non-resistant to light yield tanning agents resistant to light. The condensed sulphonic acids thus obtained constitute a new class of tanning agents which are distinguished by a high resistance to light.

The following examples serve to illustrate the invention, but they are not intended to limit it thereto, the parts being by weight:

(1) 90 parts of toluene are mixed with 120 parts of fuming sulphuric acid containing 10 per cent of free $SO_3$, and the mixture is heated to 110° C. to 120° C. (for about 4 to 6 hours) until a test portion dissolves in water; small amounts of toluene may remain unsulphonated. The melt obtained is diluted with 30 parts of water and 35 parts of hydroxybenzyl alcohol and 30 parts of dihydroxy-diphenylmethane are then introduced. The mixture is kept in a reflux apparatus at 80° C. to 90° C. for 2 to 2½ hours, i. e. until a test portion dissolves in water to a clear solution. The whole is then diluted with water and neutralized until the acidity and dilution necessary for tanning are attained. With this solution, the tanning is then carried out in known manner and a well plumped light-resistant leather is obtained.

(2) 100 parts of commercial xylene, i. e. a mixture of the three isomers thereof, are sulphonated by means of 100 parts of fuming sulphuric acid of 5 per cent strength. 30 parts of water and 70 parts of formaldehyde (of 30 per cent strength) are then added, the mass is stirred for 1 hour at 100° C. to 110° C.; 50 parts of para-para'-dihydroxydiphenylsulphone are then added and the melt is kept for further three hours at a temperature of about 100° C. As in the foregoing example, the melt is thereupon diluted with water and rendered acid. With the solution thus produced a colorless, well plumped leather of very good resistance to light is obtained.

(3) 120 parts of para-chlorotoluene are sulphonated in the manner described in Example 2 with 100 parts of fuming sulphuric acid. A condensation product obtained by condensing 75 parts of commercial cresol, 50 parts of formaldehyde (of 30 per cent strength) and 25 parts of water in the presence of a small amount of alkali while boiling for one hour, is then introduced into the melt. The temperature is kept for 2 hours at 100° C. to 105° C., while stirring. Thereafter, a test portion dissolves in water to a clear solution. After the whole has been worked up as described in the preceding examples a tanning solution is obtained. The leather treated with said solution is well plumped, bright and light-resistant.

(4) 120 parts of isopropylbenzene are sulphonated in the manner described above; the melt obtained is mixed with 75 parts of formaldehyde and kept boiling in a reflux apparatus for one hour at 100° C. and for a further hour at 120° C. 80 parts of para.para'-dihydroxydiphenyl are then introduced into the melt and the temperature is kept for further 4 hours at 120° C. A tanning agent is obtained having the good properties characterized above.

(5) 120 parts of symmetrical trimethylbenzene are sulphonated as described above and after the addition of 25 parts of water, 70 parts of a dichloromethyl-xylene obtained by reacting meta-xylene with formaldehyde and hydrogen chloride are introduced into the melt. The mass is first kept for one hour at 80° C., for a further hour at 100° C. and then for another hour at 120° C. After the evolution of hydrogen chloride has decreased the melt is diluted, the dilution is adjusted to a suitable pH-value and leathers are thereupon tanned therewith. A light, plumped leather is obtained having a good fasteness to light.

(6) 100 parts of commercial xylene are sulphonated in the manner described above. 90 parts of dihydroxydiphenylethane (prepared by condensing phenol with acetaldehyde) and 60 parts of formaldehyde (of 20 per cent strength) are then admixed to the melt, the mixture is then kept for 4 hours at about 100° C. and, after a test portion has dissolved in water to a clear solution, it is worked up as described in the preceding examples. Leathers tanned with the tanning agent thus obtained have the same good properties as indicated in the foregoing examples.

(7) 180 parts of free para-benzylchloride sulphonic acid are mixed with 80 parts of a sulphone obtained in known manner from commercial cresol by treating it with a deficiency of sulphuric acid. The mixture is slowly heated, while stirring, the temperature being raised pari passu with the decrease of the evolution of hydrogen chloride. The whole is kept for about one hour at 100° C.–110° C., i. e. until the evolution of hydrogen chloride has ceased, diluted with water and adjusted to a suitable pH-value. With the tanning solution thus obtained pelt is treated and a leather is obtained having the same properties as mentioned in the preceding examples.

(8) 120 parts of ortho-benzylchloride sulphonic acid are mixed with 75 parts of salicylic acid, 25 parts of water and 25 parts of formaldehyde (of 30 per cent strength). The mixture is heated in a manner similar to that described in Example 7, then kept, after the evolution of the hydrogen chloride has ceased, for 1–2 hours at 80° C.–90° C. and finally worked up as described in Example 7. A tanning solution is obtained yielding a leather having the same advantages as described above.

(9) 125 parts of commercial xylene, consisting of a mixture of ortho-, para- and meta-xylene, are mixed at ordinary temperature with 145 parts of chlorosulphonic acid, the mixing taking place so slowly that the temperature is not materially raised thereby. The whole is then kept for 3 hours at 50° C. 170 parts of chloromethylated para.para'- dihydroxydiphenylsulphone are then introduced into the mixture at ordinary temperature, said chloromethylated para.para'-di - hydroxydiphenylsulphone being obtained in known manner by introducing, while stirring thoroughly, hydrogen chloride into the sulphone after the addition of 200 parts of formaldehyde (of 30 per cent strength), suitably in the presence of a solvent such as acetic acid; finally, the mass is heated for a short time to 50° C.–60° C. The chloromethylated sulphone mixes homogeneously with the sulphonation melt; 35 parts of water are suitably added thereto and the melt is kept for several hours, while stirring thoroughly, at 80° C.–85° C., i. e. until a test portion dissolves in water to a clear solution. The melt is thereupon diluted with the same amount of its volume of water and such an amount of caustic soda solution or ammonia is added as is necessary for obtaining the acidity required for tanning. With the tanning agent thus obtained very light leathers having resistance to light are produced.

(10) 120 parts of commercial xylene are mixed with 100 parts of dihydroxydiphenylsulphone and into the mixture obtained 210 parts of chlorosulphonic acid are introduced at ordinary temperature. The homogeneous mixture thus obtained is kept for 4 hours at 40° C.–45° C., i. e. until a test portion dissolves in water, particularly on heating. Thereupon, 180 parts of formaldehyde (of 20 per cent strength) are introduced into the melt and the melt is kept for some further hours at an elevated temperature (80° C.–90° C.). The melt becomes essentially more viscous and, after having diluted it with water and adjusted it to the desired acidity, a tanning agent is obtained, yielding very light, well-plumped and light-resisting leathers.

If instead of formaldehyde 200 parts of benzaldehyde are used in the above reaction there is likewise obtained a light-resisting tanning agent; the leather treated therewith shows an increased plumping effect.

(11) Into a sulphonated crude melt prepared in a manner similar to that described in the preceding examples by causing 160 parts of chlorosulphonic acid to act upon 150 parts of isobutylbenzene there is introduced, while stirring thoroughly, at 30° C.–40° C., the condensation product obtained by keeping boiling for 10 hours 75 parts of salicylic acid and 50 parts of formaldehyde. The melt is kept for about 5 hours at 70° C.–80° C. After this time a test portion dissolves in water to a clear solution. After having diluted the melt with 400 parts of water and adjusted it to the desired acidity a tanning agent is obtained yielding well-plumped, light leathers having a good resistance to light.

(12) 80 parts of isobutylphenol and thereupon 50 parts of formaldehyde of 30 per cent strength are introduced into 300 parts of a sulphonation melt of the so-called solvent naphtha, i. e. a mixture of mostly mononuclear aromatic hydrocarbons, said melt being obtained in a manner similar to that described in the foregoing examples. The melt is kept for 4-6 hours at about 80° C., i. e. until a test portion dissolves in water to a clear solution. After dilution with water and neutralization with caustic soda solution the tanning agent obtained yields light leathers which are resistant to light.

In this case, too, the formaldehyde may be replaced by another condensing aldehyde such as benzaldehyde, glyoxal and the like.

We claim:

1. As new products, the resinous sulphonated condensation products consisting of aromatic hydroxy compounds containing phenolic hydroxy groups and aromatic mononuclear hydrocarbons containing at least one and at most four alkyl radicals and methylene bridges linking the aromatic nuclei of said aromatic hydroxy compounds and said aromatic mononuclear hydrocarbons, said products being valuable tanning agents.

2. As new products, the resinous sulphonated condensation products consisting of phenols and aromatic mononuclear hydrocarbons containing at least one and at most four alkyl radicals and methylene bridges linking the aromatic nuclei of said phenols and said aromatic mononuclear hydrocarbons, said products being valuable tanning agents.

ARTHUR VOSS.
WILLI SELLE.